United States Patent
Masseni

(10) Patent No.: US 12,325,280 B2
(45) Date of Patent: Jun. 10, 2025

(54) AIR CONDITIONING SYSTEM FOR A MOTOR VEHICLE

(71) Applicant: DENSO THERMAL SYSTEMS S.P.A., Poirino (IT)

(72) Inventor: Davide Masseni, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 101 days.

(21) Appl. No.: 17/904,286

(22) PCT Filed: Mar. 19, 2021

(86) PCT No.: PCT/IB2021/052309
§ 371 (c)(1),
(2) Date: Aug. 15, 2022

(87) PCT Pub. No.: WO2021/186404
PCT Pub. Date: Sep. 23, 2021

(65) Prior Publication Data
US 2023/0069805 A1    Mar. 2, 2023

(30) Foreign Application Priority Data
Mar. 20, 2020 (IT) .................. 102020000005959

(51) Int. Cl.
*B60H 1/00*    (2006.01)
(52) U.S. Cl.
CPC ..... *B60H 1/00792* (2013.01); *B60H 1/00807* (2013.01); *B60H 1/00885* (2013.01)
(58) Field of Classification Search
CPC ............ B60H 1/00792; B60H 1/00807; B60H 1/00885
See application file for complete search history.

(56) References Cited

U.S. PATENT DOCUMENTS

| 5,127,576 A | 7/1992 | Weatherhead et al. |
| 5,803,160 A * | 9/1998 | Danieau ............ B60H 1/00542 454/121 |

(Continued)

FOREIGN PATENT DOCUMENTS

| EP | 0360101 A2 | 3/1990 |
| JP | H1159158 A | 3/1993 |

OTHER PUBLICATIONS

International Search Report and Written Opinion for PCT/IB2021/052309 (Jul. 14, 2021).

(Continued)

*Primary Examiner* — Gertrude Arthur Jeanglaude
(74) *Attorney, Agent, or Firm* — Merchant & Gould P.C.

(57) ABSTRACT

A system includes a casing configured to allow air to flow towards a vehicle interior or cabin. An air treatment cavity contains a heater core of a cooling circuit. A control unit is provided which is configured to control the temperature of the air. An interface device provides the control unit with a required temperature command. An actuator is configured to adjust, in a controlled way by the control unit, the opening of a flow control valve situated upstream of the heater core. The system further includes a temperature sensor configured to detect temperature data representative of the temperature reached by the air flowing into the air treatment cavity downstream of the heater core. The control unit is also configured to control the actuator also as a function of the temperature data as a function of the temperature command.

5 Claims, 2 Drawing Sheets

(56) References Cited

U.S. PATENT DOCUMENTS

| | | | |
|---|---|---|---|
| 5,881,558 A * | 3/1999 | Kawahara | B60H 1/00692 |
| | | | 62/408 |
| 5,975,421 A | 11/1999 | Ito et al. | |
| 7,708,792 B2 * | 5/2010 | Kowalski | B60H 3/0608 |
| | | | 55/467 |
| 2005/0087332 A1 * | 4/2005 | Umeo | B60H 1/00378 |
| | | | 62/244 |
| 2016/0347150 A1 | 12/2016 | Kakade et al. | |
| 2019/0111761 A1 | 4/2019 | Jaglan et al. | |

OTHER PUBLICATIONS

Office Action dated Feb. 25, 2025 for corresponding Japanese Application No. 2022-555757 (13 pages including English Translation).

\* cited by examiner

Fig. 2

| ΔT = TR − TA (°C) | $p_i$ (%) |
|---|---|
| >50 | 100 |
| from 50 to 40 | 85 |
| from 40 to 30 | 70 |
| from 30 to 25 | 60 |
| from 25 to 20 | 52 |
| from 20 to 17 | 47 |
| from 17 to 14 | 45 |
| from 14 to 11 | 44 |
| from 11 to 8 | 43 |
| from 8 to 5 | 42 |
| from 5 to 2 | 41 |
| from 2 to -2 | 40 |
| from -2 to 5 | 39 |
| from -5 to -8 | 38 |
| from -8 to -11 | 37 |
| from -11 to -14 | 36 |
| from -14 to -17 | 35 |
| from -17 to -20 | 33 |
| from -20 to -25 | 30 |
| from -25 to -30 | 25 |
| from -30 to -40 | 20 |
| from -40 to -50 | 0 |
| <-50 | 0 |

AIR CONDITIONING SYSTEM FOR A MOTOR VEHICLE

This application is a National Stage Application of PCT/IB2021/052309, filed Mar. 19, 2021, which claims benefit of priority to application No. 102020000005959, filed Mar. 20, 2020 in Italy, and which applications are incorporated herein by reference. To the extent appropriate, a claim of priority is made to each of the above disclosed applications.

TECHNICAL FIELD

The present invention refers to an HVAC system for a motor vehicle.

In particular but not exclusively, the present invention can be applied to the agricultural vehicle field, for example to a tractor, the special vehicle field, and the off-road vehicle field.

TECHNICAL BACKGROUND

HVAC systems for motor vehicles are known. The HVAC system generally comprises a casing having an inlet opening configured to receive air, an outlet opening configured to allow air to let air out towards the vehicle interior or cabin. The casing further comprises an air treatment cavity situated between the inlet opening and the outlet opening through which an air flow can pass. The air treatment cavity contains a heater core which is part of the engine cooling circuit.

The system comprises a control unit configured to control the temperature of the air flow flowing through the heater core exiting from the outlet opening towards the vehicle interior or cabin.

The system further comprises a man-machine interface device, such as a knob, manually operable by a user in such a way as to provide the control unit with a temperature command input of treated air flow and having a temperature close to the one requested as a target by the user.

To control the temperature of the air flow exiting from the outlet opening, the system comprises an actuator configured to adjust—in a way controlled by the control unit—the opening of a water flow control valve situated upstream of the heater core in series with the engine cooling circuit as a function of the temperature command coming from the interface device.

However, the HVAC systems according to the prior art suffer from some drawbacks. Among them is the drawback that regulating the temperature of the air flow exiting towards the vehicle interior or cabin cannot be easily controlled by means of the interface device. Such drawback is also caused by the mechanical hysteresis of the interface device, which is generally a knob. Therefore, there is a consequent poor linearity in the actuator command, as this command is typically achieved by implementing an electrical potentiometer.

Patent publication EP 0 360 101 A2 discloses a temperature control system for a passenger van having individual temperature selection controls for passengers in the front and rear sections of the vehicle interior. Separate exothermic heat exchangers for the engine coolant circulation are provided for front-seat and rear-seat passengers. Each heat exchanger is supplied by a coolant control valve and the individual impellers provide a forced air flow over the heat exchangers. A thermistor detects the discharge air temperature on each heat exchanger and a controller sums the detected temperature signal with a user-selected relative temperature reference signal provided independently of front and/or rear passenger selector inputs and a valve position signal. The controller generates a control signal which is proportional to the above mentioned sum. An electric actuator for each valve moves the valve until the sum is zero to control the coolant flow to each heat exchanger so as to approximately adjust the discharge air temperature to the individually selected relative levels for the front and rear part, regardless of the fan speed. The air conditioning evaporators can be arranged upstream of each of the heat exchangers; furthermore, the thermistors detect the combined heating and cooling effect and the system continues to modulate the coolant flow to the heat exchangers for the temperature regulation.

Patent publication U.S. Pat. No. 5,127,576 A describes a system for controlling the vehicle passenger compartment comfort. An electronic controller receives inputs from: (i) a thermistor array detecting the discharge temperature of the fan plenum, (ii) a level selection control by the user, (iii) a potentiometer detecting the position of a servo-driven valve, (iv) an engine tachometer generator, and (v) a fan speed signal. The controller employs the proportional-integral-derivative (PID) strategy in a microprocessor to generate a control signal for operating the valve servomotor to maintain the plenum discharge air at a constant temperature regardless of the swings of amplitude in engine speed/water pump speed or the selector when the user changes the fan speed.

Patent publication US 2016/347150 A1 describes a thermal management system that includes a coolant pump, a high-voltage electric heater (HEH) for heating the coolant, a heater core, a fan directing air to the heater core, a cabin heater valve (CHV), sensors and a controller. The CHV has an engine bypass position blocking the coolant flow from the HEH into the engine and an engine link position leading the coolant from the HEH into the engine. In one method, the sensors measure the engine outlet coolant temperature (ECT), the inlet coolant temperature (ICT) on the HEH, the air temperature ingoing the heater core, and the air temperature exiting from the heater core. The controller calculates a target coolant temperature (TCT) value as a function of the air temperatures and mass flow rates and controls the CHV via position control signals such that the CHV is switched between the Engine Link position and the Engine Bypass position when ICT equals the calculated TCT value.

Patent publication U.S. Pat. No. 5,975,421 A describes a flow quantity control valve controlling the flow of hot water to a heat exchanger and a bypass circuit allowing hot water to bypass the heat exchanger. They are provided together with a pressure-actuated valve in the bypass circuit which is responsive to a pressure increase of hot water from an engine.

SUMMARY OF THE INVENTION

An object of the present invention is to provide an HVAC system able to solve this and other drawbacks, in particular by providing a system that is improved with respect to those provided according to the prior art.

According to the present invention, this and other objects are achieved by means of an HVAC system having the technical features mentioned in the appended independent claim.

In particular, according to an aspect of the present invention, the HVAC system comprises a temperature sensor configured to detect temperature data representative of the temperature reached by the air flowing into the air treatment cavity downstream of the heater core. The control unit is configured to control the actuator also as a function of the temperature data detected by the temperature sensor, besides as a function of the temperature command from the interface device. This can possibly reduce the problems associated with the mechanical hysteresis of interface devices and the poor linearity of the potentiometer implemented to control the actuator.

It should be understood that the appended claims are an integral part of the technical teachings herein provided in the following detailed description relating to the present invention. In particular, some preferred embodiments of the present invention including optional technical features are defined in the appended dependent claims.

Further features and advantages of the present invention will become apparent from the detailed description below, given purely by way of non-limiting example, with particular reference to the accompanying drawings summarised below.

BRIEF DESCRIPTION OF THE DRAWINGS

FIG. 2 represents a non-limiting example of a table by means of which a control unit of the system shown in FIG. 1 can operate.

Figure 1:
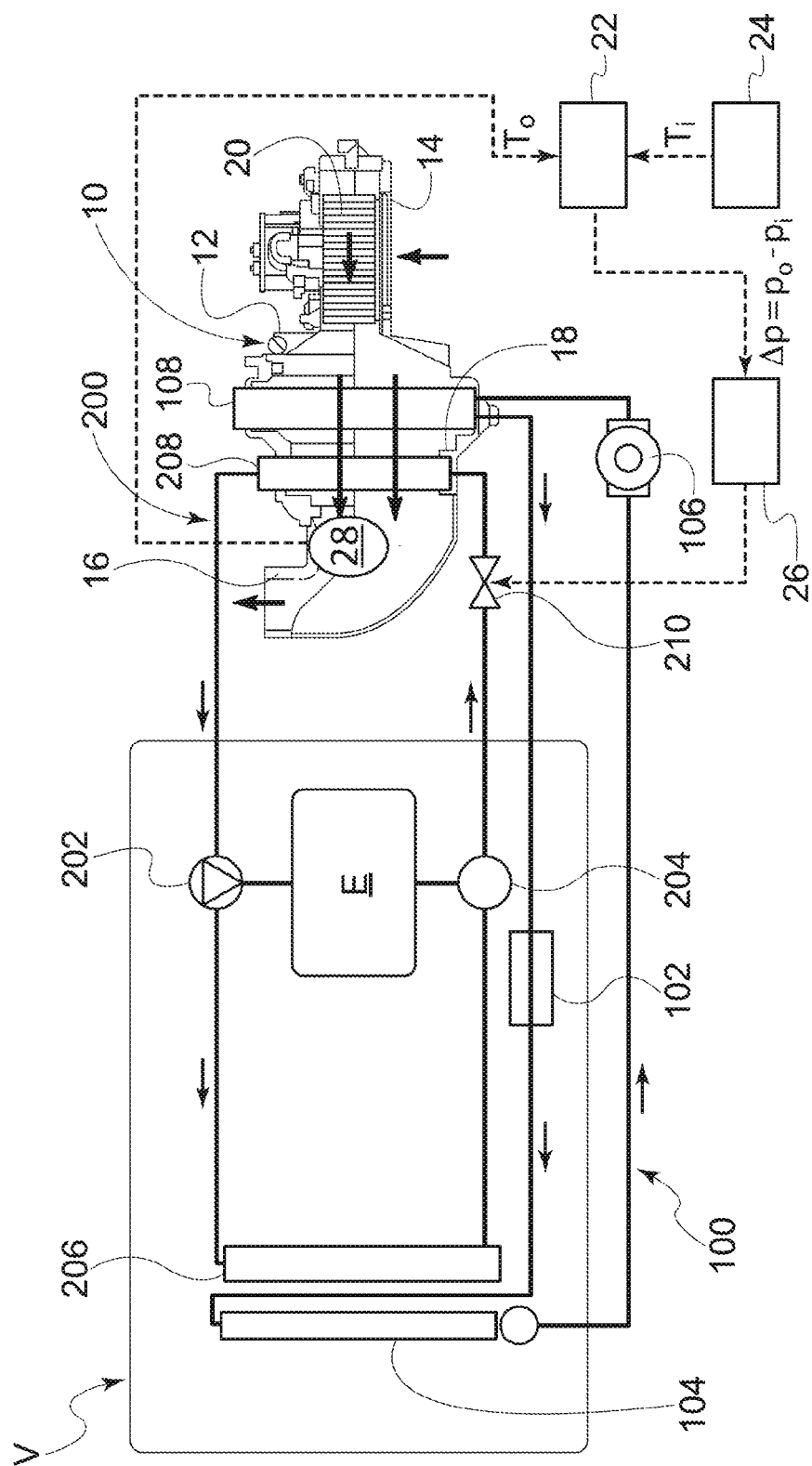
FIG. 1 is a block diagram of an HVAC system for a motor vehicle, the system being provided according to an exemplary embodiment of the present invention.

For the sake of completeness, the following is a list of the alphanumeric references used to identify parts, elements and components illustrated in the drawings summarised above.
V. Vehicle
E. Engine
$T_R$ Requested temperature command
$T_A$. Actual temperature data
$\Delta T$. Temperature difference
$\Delta T_{MIN,i}$, $\Delta T_{MAX,i}$. Temperature difference range
p*. Optimized operative position
$p_i$. Predetermined operative position
10. HVAC system
12. Casing
14. Inlet opening
16. Outlet opening
18. Air treatment cavity
20. Fan
22. Control unit
24. Interface device
26. Actuator
28. Temperature sensor
100. Refrigeration circuit
102. Compressor
104. Condenser
106. Expansion valve
108. Evaporator
200. Cooling circuit
202. Pump
204. Thermostat
206. Radiator
208. Heater core
210. Flow control valve

DETAILED DESCRIPTION OF THE INVENTION

With reference to FIG. 1, reference number 10 generally indicates an HVAC system for a vehicle V equipped with an engine E, in particular an internal combustion engine. System 10 is provided according to a purely exemplary embodiment of the present invention.

In particular but not exclusively, system 10 can be applied to the agricultural vehicle field, for example to a tractor, the special vehicle field, and the off-road vehicle field.

System 10 cooperates with a cooling circuit 200 intended for cooling engine E and belonging to vehicle V. In particular, system 10 also cooperates with a refrigeration circuit 100, also belonging to vehicle V.

In the illustrated embodiment, refrigeration circuit 100 comprises a compressor 102 which is mechanically driven by engine E and configured to make a coolant fluid circulate. Refrigeration circuit 100 further comprises a condenser 104, an expansion valve 106 and an evaporator 108.

In the illustrated embodiment, cooling circuit 200 provides a circulation of cooling water (e.g. a mixture of water and a product with antifreeze properties) which is in heat exchange with engine E (e.g. with the liners of the combustion chambers of engine E). Circulation through cooling circuit 200 is preferably provided by a pump 202. Cooling circuit 200 further comprises a thermostat 204 configured to receive the cooling water exiting the engine E and to distribute the cooling water flow between a radiator 206 and a heater core 208. Between thermostat 204 and heater core 208, a flow control valve 210 is provided which is configured to control the flow rate of cooling water flowing to the heater core 208. Moreover, pump 202 is configured to receive inlet water from radiator 206 and heater core 208.

System 10 comprises a casing 12 having an inlet opening 14 configured to receive air and an outlet opening 16 configured to allow air to flow towards the vehicle interior or cabin. Furthermore, the casing comprises an air treatment cavity 18 situated between inlet opening 14 and outlet opening 16. An air flow from inlet opening 14 and directed to outlet opening 16 towards vehicle interior or cabin V can pass through air treatment cavity 18.

In the illustrated embodiment, system 10 further comprises a fan 20, for example, controlled by an electric motor. Fan 20 is configured to generate the air flow through air treatment cavity 18 from inlet opening 14 to outlet opening 16.

In the illustrated embodiment, air treatment cavity 18 contains heater core 208 of engine cooling circuit 200 of HVAC system 10 and, in particular, evaporator 108 of refrigeration circuit 100 of HVAC system 10. In accordance with methods and principles per se known, evaporator 108 is configured to cool the air flow, while heater core 208 is configured to heat the air flow through air treatment cavity 18 from inlet opening 14 to outlet opening 16.

System 10 further comprises a control unit 22. In particular, control unit 22 is configured to control the temperature of the air flow flowing through heater core 208 and exiting outlet opening 16.

System 10 comprises an interface device 24, for example a knob, configured to be manually operated by the user. Interface device 24 therefore provides at the inlet of control unit 22 with a requested temperature command $T_R$ associated with the desired temperature to be reached by the air flow exiting from outlet opening 16. For example, the angular position of the knob can be assigned a temperature value to be reached—by means of control unit 22—by the air flow and corresponding to requested temperature command $T_R$.

System 10 comprises an actuator 26 configured to adjust the opening of flow control valve 210 in a way controlled by said control unit 22. For example, actuator 26 is a stepper-type actuator.

As will be further described more in details, control unit 22 controls actuator 26 as a function of the requested temperature command $T_R$ received by interface device 24.

System 10 comprises a temperature sensor 28 configured to detect actual temperature data $T_A$ representative of the temperature reached by the air flowing into said air treatment cavity 18 downstream of heater core 208. In particular, temperature sensor 28 is situated next to the outer surface of heater core 208. In the illustrated embodiment, temperature sensor 28 is situated in air treatment cavity 18 between heater core 208 and outlet opening 16.

As will be further described below, besides as a function of requested temperature command $T_R$, control unit 22 is also configured to control actuator 26 as a function of actual temperature data $T_A$ detected by temperature sensor 28.

Preferably, temperature sensor 28 is a thermistor, for example, of the negative temperature coefficient or NTC type.

The control mode implemented by control unit 22 will now be described in detail.

Control unit 22 is configured to calculate a temperature difference $\Delta T$ between requested temperature command $T_R$ and actual temperature data $T_A$. In particular, the temperature difference is obtained through $\Delta T = T_R - T_A$ formula.

Then, control unit 22 determines an optimized operative position p* of flow control valve 210 as a function of the previously calculated temperature difference $\Delta T$.

Furthermore, control unit 22 controls actuator 26 in such a way as to bring the flow control valve 210 into optimized operative position p* determined by such control unit 22.

Preferably, optimized operative position p* is determined based on a tabular logic.

In particular, memory means are associated with and/or related to control unit 22 which store a table containing
- a plurality of temperature difference ranges $\Delta T_{MIN,1}$, $\Delta T_{MAX,1}$; . . . ; $\Delta T_{MIN,i}$, $\Delta T_{MAX,i}$; . . . ; $\Delta T_{MIN,n}$, $\Delta T_{MAX,n}$; and
- a respective plurality of predetermined operative positions $p_1$; . . . ; $p_i$; . . . ; $p_n$, wherein each predetermined operative position $p_i$ is related to a corresponding temperature difference range $\Delta T_{MIN,i}$, $\Delta T_{MAX,i}$.

Each of the n temperature difference ranges is defined by a respective temperature difference minimum value $\Delta T_{MIN,i}$ and a respective temperature difference maximum value $\Delta T_{MAX,i}$, wherein the i index can vary between 1 and n.

Preferably, control unit 22 is configured to select the predetermined operative position $p_i$ corresponding to the temperature difference range $\Delta T_{MIN,i}$, $\Delta T_{MAX,i}$ in which temperature difference $\Delta T$ is comprised as optimized operative position p*.

In FIG. 2, an example of a table drawn as previously described is represented. In said table, requested temperature command $T_R$ and actual temperature data $T_A$ (and therefore relevant temperature difference $\Delta T$) are defined by sizes or measurements expressed in Celsius degrees (° C.). On the other hand, predetermined operative positions $p_1$; . . . ; $p_i$; . . . ; $p_n$, are expressed in terms of the percentage of opening of associated flow control valve 210.

Below, a non-limiting example of control unit 22 operation is provided.

Consider a user handling the knob of interface device 24 in such a way as to provide control unit 22 with a requested temperature command $T_R$ input equal to 22° C. and a temperature sensor 28 detecting actual temperature data $T_A$ equal to 19° C. Control unit 22 calculates temperature difference $\Delta T$ (calculated as $T_R - T_A$) equal to 3° C. Based on the table illustrated in FIG. 2, the predetermined operative position equal to 41% of opening of flow control valve 210 is selected by control unit 22 as optimized operative position p*. Consequently, control unit 22 controls actuator 26 so that it brings flow control valve 210 into the above-mentioned predetermined operative position equal to 41% of opening.

Naturally, without prejudice to the principle of the invention, the embodiments and implementation details may be widely varied with respect to what is described and illustrated purely by way of non-limiting example, without thereby departing from the scope of the invention as defined in the appended claims.

The invention claimed is:

1. A heating, ventilation and air conditioning (HVAC) system for a vehicle equipped with an engine; said system comprising:
   a casing having an inlet opening configured to receive air, an outlet opening configured to allow air to flow towards the vehicle interior or cabin, and an air treatment cavity situated between said inlet opening and said outlet opening and through which an air flow can pass; a heater core of a cooling circuit associated with said engine being contained in said air treatment cavity;
   a control unit configured to control a temperature of the air flow flowing through said heater core and exiting from said outlet opening;
   an interface device manually operable by a user to provide as an input a required temperature command to the control unit representative of a desired temperature to be reached by the air flow exiting from the outlet opening;
   an actuator configured to adjust, in a controlled way by said control unit, opening of a flow control valve situated upstream of said heater core and configured to control a flow rate of cooling water flowing to said heater core, as a function of said required temperature command received from said interface device;
   a temperature sensor configured to detect actual temperature data representative of the temperature reached by the air flowing into said air treatment cavity downstream of said heater core; and
   wherein, as a function of said requested temperature command, the control unit is configured to control said actuator as a function of said actual temperature data detected by said temperature sensor; and
   wherein said control unit is configured to:
      calculate a temperature difference between said requested temperature command and said actual temperature data; and
      determine an optimized operative position of said flow control valve as a function of said temperature difference;
   wherein said predefined operative position is determined based on a tabular logic;
   wherein a memory is associated with and/or related to the control unit which stores a table containing:
      a plurality of temperature difference ranges, and
      a respective plurality of predetermined operative positions, wherein each predetermined operative position is related to a corresponding temperature difference range, and is based on a percentage of opening of said flow control valve;
   wherein said actuator comprises a stepper actuator controlled by said control unit to bring said flow control valve into said optimized operative position.

2. The system according to claim 1, wherein said control unit is configured to select the predetermined operative position corresponding to the temperature difference range in which said temperature difference is comprised as the optimized operative position.

3. He system according to claim 1, wherein said temperature sensor is situated in the air treatment cavity next to the outer surface of said heater core.

4. The system according to claim 1, wherein said temperature sensor is a thermistor.

5. The system according to claim 4, wherein said thermistor comprises a negative temperature coefficient (NTC) thermistor.

\* \* \* \* \*